United States Patent
Vangelov et al.

(10) Patent No.: US 10,162,625 B2
(45) Date of Patent: Dec. 25, 2018

(54) VEHICLE CONTROL STORAGE METHODS AND SYSTEMS

(71) Applicant: Ford Global Technologies, LLC, Dearborn, MI (US)

(72) Inventors: John Vangelov, South Lyon, MI (US); Michael Raymond Westra, Plymouth, MI (US); Joseph Patrick Oravec, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/685,970

(22) Filed: Apr. 14, 2015

(65) Prior Publication Data
US 2016/0306624 A1 Oct. 20, 2016

(51) Int. Cl.
G06F 9/445 (2018.01)
G06F 8/654 (2018.01)
H04L 29/08 (2006.01)
G06F 9/4401 (2018.01)

(52) U.S. Cl.
CPC .............. *G06F 8/654* (2018.02); *H04L 67/12* (2013.01); *H04L 67/34* (2013.01); *G06F 9/4401* (2013.01)

(58) Field of Classification Search
CPC .......... G06F 8/665; H04L 67/12; H04L 67/34
See application file for complete search history.

(56) References Cited

U.S. PATENT DOCUMENTS

| | | | |
|---|---|---|---|
| 8,631,239 B2 | 1/2014 | Djabarov et al. | |
| 2004/0225850 A1 | 11/2004 | Li et al. | |
| 2006/0259207 A1* | 11/2006 | Natsume | G06F 8/65 701/1 |
| 2007/0006211 A1* | 1/2007 | Venkiteswaran | G06F 8/665 717/168 |
| 2009/0300595 A1* | 12/2009 | Moran | G06F 8/65 717/170 |
| 2011/0320089 A1* | 12/2011 | Lewis | G01C 21/32 701/29.6 |
| 2013/0124793 A1 | 5/2013 | Gyl et al. | |
| 2015/0301821 A1* | 10/2015 | Danne | H04L 67/06 717/169 |
| 2016/0013934 A1* | 1/2016 | Smereka | G06F 21/572 713/171 |
| 2016/0371077 A1* | 12/2016 | Moeller | H04L 67/12 |
| 2017/0300313 A1* | 10/2017 | Gantt, Jr. | G06F 8/65 |

OTHER PUBLICATIONS

Luiz Ramos et al., Page Placement in Hybrid Memory Systems, ACM, 2011, retrieved online on Sep. 17, 2018, pp. 85-95. Retrieved from the Internet:<URL: http://delivery.acm.org/10.1145/2000000/1995911/p85-rarnos.pdf?>. (Year: 2011).*

* cited by examiner

*Primary Examiner* — Hanh Thi-Minh Bui
(74) *Attorney, Agent, or Firm* — Jennifer M. Stec; Brooks Kushman P.C.

(57) ABSTRACT

A vehicle can include methods and systems to update controls for a plurality of vehicle systems that operate using updatable controls, wherein each control is mounted in vehicle persistent memory as an image. The controls are stored in non-volatile vehicle memory that has a size less than twice a size of all of the controls loaded thereon. A core system provides access to the control images in the memory.

14 Claims, 6 Drawing Sheets

VEHICLE CONTROL STORAGE METHODS AND SYSTEMS

TECHNICAL FIELD

Systems and methods relating to storage of a vehicle control for a vehicle are described herein.

BACKGROUND

A vehicle has various components that may be controlled by software. Even though the software controls of a vehicle are typically not changed during normal operation of the vehicle, updates of the software controls may be desirable or even necessary during the lifetime of a vehicle. Such updates may install new functionality, update existing functionality, correct errors or the like. To update software of a vehicle component, the vehicle may be driven to a dealership and serviced by a technician. The technician may connect a wire to the vehicle to utilize a system that tracks the individual software levels of every component in the vehicle as well as available software updates. The technician may manually apply the software updates indicated by the system and record any changes back into the system.

SUMMARY

A vehicle includes a plurality of vehicle systems that operate using updatable controls, wherein each control is mounted as an image; a non-volatile, vehicle memory to store the controls, the vehicle memory having a memory size less than twice a size of all of the controls; and a file control system to provide access to the control images on the memory. In an example, the image of each control is a fixed size. In an example, the memory is divided into areas in which the images are stored and the partitions do not have fixed offsets. In an example, the memory is only updatable on the image basis and not on a file basis. In an example, the file control system tracks images stored on the memory.

The vehicle can further include error checking that is performed on an image basis and not on a file basis.

In an example, the controls include a first group of fixed images that are updated over-the-air and a second group of images that can be updated over-the-air. In an example, the first group includes a vehicle parameter image. The second group includes a plurality of application images that can operate in the vehicle to control various vehicle operations and systems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure refers to an image, which is a digital compilation that can be mounted in a computing device, e.g., processors in a vehicle. An image is not a traditional file. An image can contain binary content including instructions, data and the structure of a disk volume. An image is mounted in the computing device to operate as stand-alone instructions for its assigned task. The image, in an example, need not refer to the operating system to perform the task of the image. Images as used herein can include a set binary file that is not limited in size. The image can be stored at a unique mount point in the vehicle storage. The mount point can be tracked by the virtual file system, e.g., the core operating system. The mount point can be at a start of a page of persistent memory. A mount of an image results in the image performing as its own stand-alone, virtual drive. The storage system merely tracks the beginning location of the mounted drive in the system memory and any discontinuous storage of the mounted image. An image may include the instructions for performing a vehicle function and data that relates to the vehicle function. Accordingly, each application that is stored and mounted in the vehicle memory as an image acts as its own disk.

Figure 1:
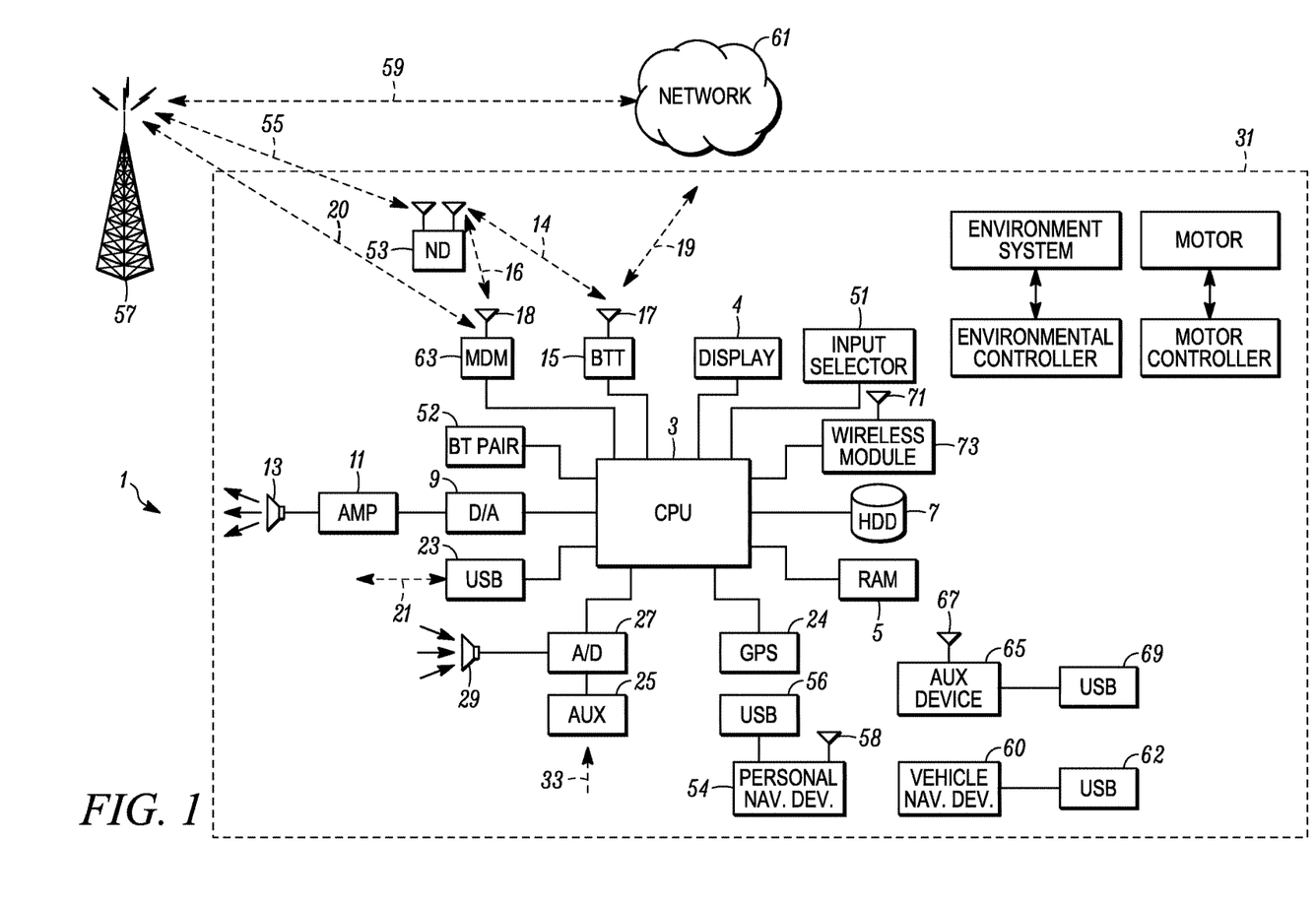
FIG. 1 illustrates an example block topology for a vehicle-based computing system for a vehicle.

FIG. 1 illustrates an example block topology for a vehicle-based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle 31. The user may also be able to interact with the interface if it is provided, for example, with a touch sensitive screen. In another illustrative embodiment, the interaction occurs through, button presses, spoken dialog system with automatic speech recognition and speech synthesis. The interface 4 may include an electronic control module that uses hardware to execute controls to provide a display and interaction with a user, e.g., the vehicle driver.

In the illustrative embodiment 1 shown in FIG. 1, a processor 3 or central processing unit (CPU) 3 controls at least some portion of the operation of the vehicle-based computing system. Provided within the vehicle 31, the processor 3 allows onboard processing of commands, controls and routines. Further, the processor 3 is connected to both non-persistent storage 5 and persistent storage 7. In this illustrative embodiment, the non-persistent storage 5 is random access memory (RAM) and the persistent storage 7 is a hard disk drive (HDD) or flash memory. In general, persistent (non-transitory) storage 7 can include all forms of memory that maintain data when a computer or other device is powered down. These include, but are not limited to, solid state hard drives, HDDs, read/write compact disks (CDs), read/write digital versatile disks (DVDs), magnetic tapes, solid state drives, portable universal serial bus (USB) drives and any other suitable form of persistent storage 7. Other forms of persistent memory include flash memory (NAND Flash and NOR Flash) and embedded MultiMediaCard (eMMC). In an example, the storage 7 has a storage size, e.g., one gigabyte, or multiple gigabytes, that is less than twice the total size of the controls being stored therein. The storage size can be more than 1.5 times the size of the controls and less than twice the size of the controls. The storage 7 can store each of the controls as a separate image containing the software instructions for the respective control. These images can be mounted by the operating system, e.g., in a loopback mount technique that allows the images to be interpreted by the VCS 1 as individual devices such as individual drives for each application in the vehicle. The images may be tracked by a file system that operates on the image level and not on individual files in the individual image. In an example, the file system stores the location and offset for the images but not the files or data within the images. The file system can treat each image as an individual partition of storage 7. Each partition may be dedicated to a specific function or a specific module of the vehicle.

The processor 3 is also provided with a number of different inputs allowing the user to interface with the processor 3. In this illustrative embodiment, a microphone 29, an auxiliary input 25 (for input 33), a USB input 23, a global positioning system (GPS) input 24, the screen 4, which may be a touchscreen display, and a BLUETOOTH input 15 are all provided. Each of these inputs may include an electronic control module that executes controls for the various electronics of the inputs to operate. An input selector 51 is also provided, to allow a user to swap between various inputs. Input to both the microphone and the auxiliary connector is converted from analog to digital by a converter 27 before being passed to the processor 3. Although not shown, numerous vehicle components and auxiliary components in communication with the VCS 1 may use a vehicle network (such as, but not limited to, a controller area network (CAN) bus) to pass data to and from the VCS 1 (or components thereof). Such vehicle components can be controlled by the processor 3, other electronic circuitry, or electronic control modules that execute controls, which can be in the form of hardware or hardware executing the controls for a specific vehicle component. While described embodiments relate to vehicle controls, other controls embedded in other systems and devices may also use the memory schemes described herein to allow for efficient updating of control instructions for multiple modules in such a system. Other modules can include engine control modules, operational control modules, safety modules, and the like.

Outputs to the VCS system 1 can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively. Each of these outputs may include an electronic control module that executes controls for the various electronics of the inputs to operate. In some examples, the VCS system executes controls, e.g., through electronic circuitry or electronic control modules that execute controls.

In one illustrative embodiment, the system 1 uses the BLUETOOTH transceiver 15 to establish a communication link 17 with a portable device 53 (e.g., cell phone, smart phone, PDA, or any other device having wireless remote network connectivity). The portable device 53 can then be used to establish a communication link 59 with a network 61 outside the vehicle 31 through, for example, communication 55 with a cellular tower 57. In some embodiments, tower 57 may be a Wi-Fi access point.

Exemplary communication between the portable device 53 and the BLUETOOTH transceiver is represented by communication 14.

Pairing a portable device 53 and the BLUETOOTH transceiver 15 can be instructed through a button 52 or similar input. Accordingly, the CPU is instructed that the onboard BLUETOOTH transceiver 15 will be paired with a BLUETOOTH transceiver in a portable device 53.

Data may be communicated between CPU 3 and network 61 utilizing, for example, a data-plan, data over voice, or dual-tone multiple frequency (DTMF) tones associated with portable device 53. Alternatively, it may be desirable to include an onboard modem 63 having antenna 18 to communicate 16 data between CPU 3 and network 61 over the voice band. The portable device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem 63 and communication 20 may be cellular communication.

In one illustrative embodiment, the processor 3 is provided with an operating system including an API to communicate with modem application software. The modem application software may access an embedded module or firmware on the BLUETOOTH transceiver to complete wireless communication with a remote BLUETOOTH transceiver (such as that found in a portable device). Bluetooth is a subset of the Institute of Electrical and Electronics Engineers (IEEE) 802 personal area network (PAN) protocols. IEEE 802 local area network (LAN) protocols include wireless fidelity (Wi-Fi) and have considerable cross-functionality with IEEE 802 PAN. Both are suitable for wireless communication within a vehicle 31. Another communication strategy that can be used in this realm is free-space optical communication (such as infrared data association (IrDA)) and non-standardized consumer infrared (IR) protocols.

In another embodiment, portable device 53 includes a modem for voice band or broadband data communication. In the data-over-voice embodiment, a technique known as frequency division multiplexing may be implemented where the owner of the portable device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle 31 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 Mbs for stationary or walking users and 385 kbs for users in a moving vehicle 31. 3G standards are now being replaced by IMT-Advanced (4G) which offers 200 Mbs for users in a vehicle 31 and 1 Gbs for stationary users. If the user has a data-plan associated with the portable device 53, it is possible that the data-plan allows for broad-band transmission and the system could use a much wider bandwidth (speeding up data transfer). In still another embodiment, portable device 53 is replaced with a cellular communication device (not shown) that is installed to vehicle 31. In yet another embodiment, the ND 53 may be a wireless LAN device capable of communication over, for example (and without limitation), an 802.11g network (i.e., Wi-Fi) or a WiMax network.

In one embodiment, incoming data can be passed through the portable device 53 via a data-over-voice or data-plan, through the onboard BLUETOOTH transceiver and into the processor 3 of the vehicle 31. In the case of certain temporary data, for example, the data can be stored on the HDD or other storage media 7 until such time as the data is no longer needed.

Additional sources that may interface with the vehicle 31 include a PND 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices 65 can be connected through a wireless connection 67 or a wired connection 69. Auxiliary device 65 may include, but are not limited to, personal media players, wireless health devices, portable computers, and the like.

Also, or alternatively, the CPU 3 could be connected to a vehicle-based wireless router adapter 73, using for example a Wi-Fi (IEEE 802.11) transceiver 71. This could allow the CPU 3 to connect to remote networks within range of the local router 73.

In addition to having exemplary processes executed by a vehicle computing system located in a vehicle 31, in certain embodiments, the exemplary processes may be executed at least in part by one or more computing systems external to and in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process includes a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the VCS 1 located within the vehicle 31 is itself capable of performing the exemplary processes.

Figure 2:
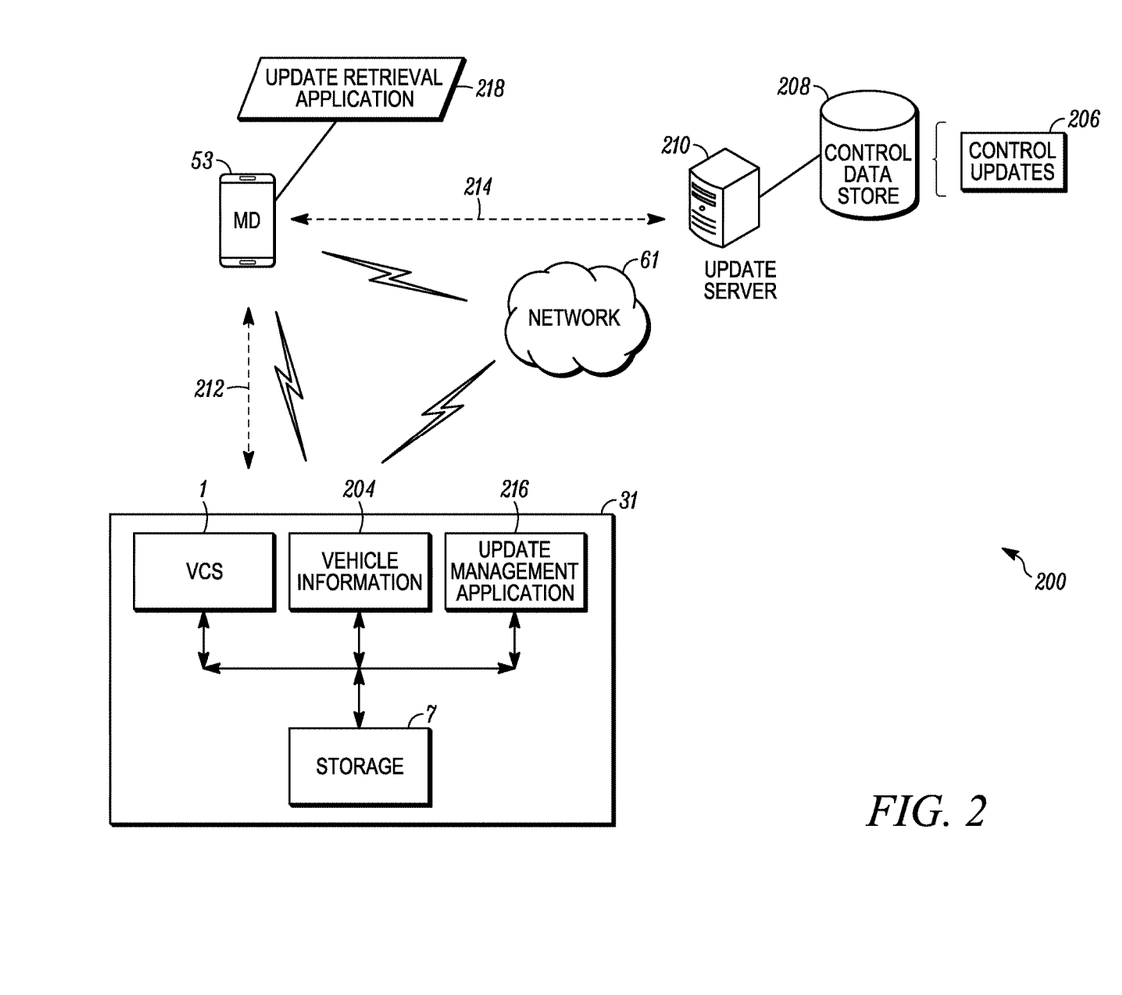
FIG. 2 illustrates an example vehicle system for providing control updates to the vehicle by way of a portable device.

FIG. 2 illustrates vehicle 31 that communicates with system 200 for providing control updates 206 to the vehicle 31 by way of electrical or electronic communication, e.g., directly via a wireless or wired network 61 or through the portable device 53. The system 200 may include the VCS 1 in communication over the network 61 with an update server 210, e.g., directly, or via the portable device 53. Communication can occur over a USB protocol, wireless networks (mobile or cellular phone, Wi-Fi) or other machine to machine communication methods. The update server 210 may communicate with a control instruction data store 208 configured to maintain control instruction(s) updates 206 for download. The system 200 may further include an update management application 216 installed to the vehicle 31 and configured to install control updates 206 to a plurality of modules of the vehicle 31. The controls data is stored in the storage 7. The controls for the modules are stored as discrete images that can contain data and instructions for interacting with components of the modules and contain data for use by the instructions. The images act as individual partitions for each application mounted in the vehicle memory. A control update can be downloaded to storage while the module continues to execute previously loaded controls. This allows the vehicle to operate, while new or updated controls are being loaded to the module. The module will continue to use prior instructions until the newly loaded instructions pass a validity check process. Thereafter the module may execute the newly loaded instructions. The modules can revert back to the prior controls if the new controls are determined to have an issue after they are first used. At some point in time, the old control image file is deleted from the storage 7 to make available storage space for new controls to be loaded. The storage 7 has a size that is less than twice the size of all the controls stored in the storage. As a result, some old controls must be deleted to provide storage area for any subsequent control update to be received, e.g., from the update server wirelessly or through a wired connection. Other examples of over the air updating of vehicle controls and software are described in U.S. patent application Ser. No. 14/559,582, filed 3 Dec. 2014, titled REMOTE VEHICLE APPLICATION PERMISSION CONTROL AND MONITORING; Ser. No. 14/601,571, filed 21 Jan. 2015, titled VEHICLE CONTROL UPDATE METHODS AND SYSTEMS; Ser. No. 14/189,297, filed 25 Feb. 2014, titled SILENT IN-VEHICLE SOFTWARE UPDATES, which are hereby incorporated by reference, however, if the present explicit disclosure conflicts with any document incorporated by reference, the present explicit disclosure controls.

The portable device 53 may be in communication with the update server 210 via a wide-area data connection 214 and with the update management application 216 of the VCS 1 via a local data connection 212. As explained in detail below, an update retrieval application 218 installed to the portable device 53 may be configured to receive indications of control updates 206 to download from the update management application 216, download the control updates 206 when the portable device 53 is connected to a suitable wide-area data connection 214 away from the vehicle 31, and provide the downloaded control updates 206 to the VCS 1 when the portable device 53 is returned to the vehicle 31. While an exemplary system 200 is shown in FIG. 2, the exemplary components illustrated in FIG. 2 are not intended to be limiting. Indeed, the system 200 may have more or fewer components, and additional or alternative components and/or implementations may be used.

The vehicle modules used by the VCS 1 may include various vehicle components configured to receive updates of associated controls, which can be in the form of software, firmware, or configuration settings. As some non-limiting examples, the vehicle modules may include a powertrain control module (PCM), a brake system control module (BSCM), a body control module (BCM), a convenience control module (CCM), battery management module, environmental control unit, and engine control module (ECM).

The vehicle information 204 may include information configured to identify the vehicle 31 or the vehicle 31 configuration. For example, the vehicle information 204 may include a vehicle identification number (VIN) published to the vehicle CAN bus, or subscriber identity module (SIM) information of the modem 63 such as international mobile station equipment identity (IMEI). Additionally or alternately, the vehicle information 204 may include version information for at least a portion of the hardware and software components of the vehicle modules 202 of the vehicle 31.

The control updates 206 may include changes to the control instructions or settings of the vehicle 31 to address an issue with the operation of the various vehicle modules, or to provide improved functionality to the current controls in the modules. The controls updates 206 may include, for example, updated configuration settings for one or more vehicle modules 202, and/or updated versions of controls (e.g., instructions, software or firmware) to be installed on one or more vehicle modules 202. In some cases controls updates 206 may include a single section, while in other cases a controls update(s) 206 may be organized into multiple subsections, partitions, or chunks, where all the subsections may be downloaded to complete the overall controls update 206 to be installed. These multiple parts of the control update can be reformed for storage as an image in the vehicle memory storage 7. Thus, an individual control update can be broken into parts to allow for efficient communication of the update to the vehicle. Moreover, multiple controls updates can be sent simultaneously with individual control updates being divided into parts, e.g., packets, for communication to the vehicle and reassembled into a complete image at the vehicle. Multiple controls updates can be started and launched in the vehicle at the same time.

The control data store 208 may be configured to store the control updates 206. The controls data store 208 may be further configured to store additional information regarding the maintained control updates 206. For example, the controls data store 208 may be configured to maintain indications of which vehicle module(s) are associated with which controls updates 206. The controls data store 208 may further store information indicative of the compatibility of the updates 206 to vehicle model or configuration. For instance, a storage entry for a controls update 206 may indicate that the update 206 is compatible with a certain make and model of vehicle 31, or that it has a dependency on a version of another vehicle module 202 being of a particular version or versions.

The update server 210 may include one or more devices configured to serve the updates 206 stored by the data store 208 to the vehicles 31. For example, the update server 210 may be configured to receive requests for available updates 206 from vehicle(s) 31. The requests may include vehicle information 204 to allow the update server 210 to query the data store 208 for updates 206 applicable to the vehicle 31 as it is currently configured. The data store 208 stores complete images of a control for a vehicle module that can be downloaded to the vehicle. The server 210 may provide, responsive to the requests, indications of updates 206 to update the requesting vehicle 31 that may be downloaded and installed. The updates 206 are images of the control update including instructions and data. The server 210 may be further configured to serve the updates 206 to devices requesting to download the updates 206 according to the provided indications.

The VCS 1 may be configured to communicate with the update server 210 over the network 61. In some cases, the VCS 1 may make use of integrated network functionality of the VCS 1, such as the internal modem 63, to facilitate communication with the update server 210. In other cases, the VCS 1 may utilize a local data connection 212 to the portable device 53 to facilitate communication with the update server 210 via a wide-area data connection 214 of the portable device 53. As an example, for a portable device 53 running the Android operating system maintained by the Open Handset Alliance of Silicon Valley, Calif., the data connection 212 may be established via a wireless Bluetooth connection. As another example, for a portable device 53 running the iOS operating system maintained by Apple, Inc. of Cupertino, Calif., the data connection 212 may additionally or alternately be established over a wired USB connection (not shown).

The portable device 53 may further be configured to establish a wide-area data connection 214 (e.g., an Internet connection) between the portable device 53 and the update server 210, such as a connection over the network 61. The portable device 53 may be further configured to maintain information regarding which wide-area data connections 214 may be preferred by the user for downloading information (or which types of wide-area data connections 214). For instance, to avoid mobile data plan overage charges, the portable device 53 may be configured to defer requests to download files when connected to the network 61 via a cellular wide-area data connection 214, and may be configured to handle the download requests (including any deferred requests) when connected to a Wi-Fi wide-area data connections 214. As another possibility, the portable device 53 may be configured to defer requests until the portable device 53 is connected to the network 61 via a wide-area data connection 214 on a list of preferred wide-area data connections 214 (e.g., selected by the user from a network control panel user interface of the portable device 53).

Due to the portable nature of the portable device 53, it should be noted that the portable device 53 may maintain a wide-area data connection 214 in some cases when it is not in communication with the VCS 1 over the data connection 212. As one example, the portable device 53 may utilize the wide-area data connection 214 over a home Wi-Fi network of the user or a public WI-FI when the portable device 53 is not paired with or within the vicinity of the vehicle 31. The portable device 53 can be removed from the vehicle, e.g., carried to and away from the vehicle by the user.

The VCS 1 may be configured to communicate with the update server 210 using a wired connection (at least partly non-wireless connection). The update server 210 may load a control update onto a memory device, e.g., a USB enabled device. The memory device can connect to the vehicle at the USB port 23 and download the update to the storage 7.

The update management application 216 may be configured to manage the installation of control updates 206 to the vehicle 31. For example, the update management application 216 of the VCS 1 may receive a command from a user requesting to check for a control update 206. As another possibility, the update management application 216 may trigger a periodic check for a new control update 206. When triggered, the update management application 216 may be configured to send a request to the update server 210 to inquire whether a control update 206 for the vehicle 31 is available. For example, the update management application 216 may query the update server 210 using the vehicle information 204 (or, if the control data store 208 maintains current vehicle information 204, an identifier of the vehicle 31), and may receive a response from the update server 210 indicative of whether new control update image 206 for the vehicle 31 are available (e.g., as links or other identifiers of control updates 206 for the vehicle 31 to download). If the response to the update management application 216 indicates that a control update image 206 is available for the vehicle 31, the update management application 216 may be further configured to queue the control update image 206 to be downloaded and installed. In another example, the dealership, e.g., when the vehicle 31 is at dealership for maintenance may trigger the update management application 216 by sending a code to the vehicle and access the current versions or the controls stored in the vehicle modules 202.

The update retrieval application 218 may be configured to cause the portable device 53 to download the control update image(s) 206 over the wide-area data connection 214. For instance, the update retrieval application 218 may be configured to receive a listing of the control update image 206 identified by the update management application 216 as being available for download and install. The update retrieval application 218 may be further configured to detect when the portable device 53 has access to a wide-area data connection 214 suitable for download of the control update image 206, and may perform the downloads when so connected. As an example, the update retrieval application 218 may be configured to download the updates over predefined approved connections or connection types. As a possibility, the predefined connections or connection types may be selected by the user from a network control panel user interface of the update retrieval application 218. As another possibility, the update retrieval application 218 may simply prefer certain types by default (e.g., to prefer Wi-Fi connections over cellular). The approved connections or connection types may be utilized to avoid incurring data usage charges or roaming charges for retrieving the vehicle update. In one possibility, the update retrieval application 218 may be configured to download the control update image 206 while connected to a relatively high bandwidth wide-area data connection 214 away from the vehicle 31 such as the user's home Wi-Fi network.

By using the facilities of the portable device 53, the vehicle 31 may accordingly be able to have its control update image(s) 206 downloaded over wide-area data connections 214 that may be unavailable to the vehicle 31 but available to the portable device 53. Thus, the update retrieval application 218 may allow the portable device 53 to download control update image(s) 206 when the portable device 53 is away from the vehicle 31 but connected to the network 61.

When the portable device 53 is returned to the vehicle 31, the update retrieval application 218 may be configured to provide the downloaded control update image(s) 206 or parts thereof to the VCS 1. The update retrieval application 218 may also be configured to provide status information to the update management application 216 of the VCS 1 indicating what control updates 206 or portions of control updates 206 have been downloaded. As another possibility, the update management application 216 may be configured to query the portable device 53 for the status of any downloaded control updates 206, and the update retrieval application 218 may be configured to respond with any downloaded control updates 206, as well as with status information indicating what control updates 206 or portions of control updates 206 have been downloaded.

In some cases, some control updates 206 may be downloaded using the portable device 53, while other control updates 206 may be downloaded by the vehicle 31. The control updates are complete images when the control update is an application for the vehicle. The update management application 216 may be further configured to manage identification of which control updates 206 or sections of control updates 206 have been downloaded, and which may still need to be updated. This updated information on what still required downloading may be provided as an updated listing by the update management application 216 to the update retrieval application 218. Thus, if a control update 206 or portion of a control update 206 is received by the VCS 1 in some other manner (e.g., by download by the VCS 1, by download using another portable device 53 associated with the VCS 1, etc.), the portable device 53 may be apprised of the update status and may remove the retrieved control update 206 from its listing of control updates 206 to download.

In another example, the update retrieval application 218 can be run in the vehicle 31, e.g., by the VCS 1. The update retrieval application 218 can operate essentially the same as described above for the portable communication device 53. The update retrieval application 218 can also be part of the update management application 216 in the vehicle.

An application where reliability of the update process is of great concern is the over-the-air (OTA) update of vehicles and controls for vehicles. This may be particular important when updated software is received from a remote update system via a cellular communications network. The use of images to contain an entire partition of software controls allows a more efficient use of the memory and more efficient error checking. In some applications, a user must approve of over-the-air downloading of an image. The updated controls may contain signatures that can be used to prevent tampering during transit and/or used to verify the controls files received at the vehicle.

The sending of control updates to the vehicle can be performed in the background while the vehicle is in use or anticipated to be in use. The control updates are digital files, in some cases in the form of images for vehicle applications, that can be stored in storage 7 until appropriate checks and the VCS 1 can load the control update for use without impacting vehicle operation.

Figure 3:
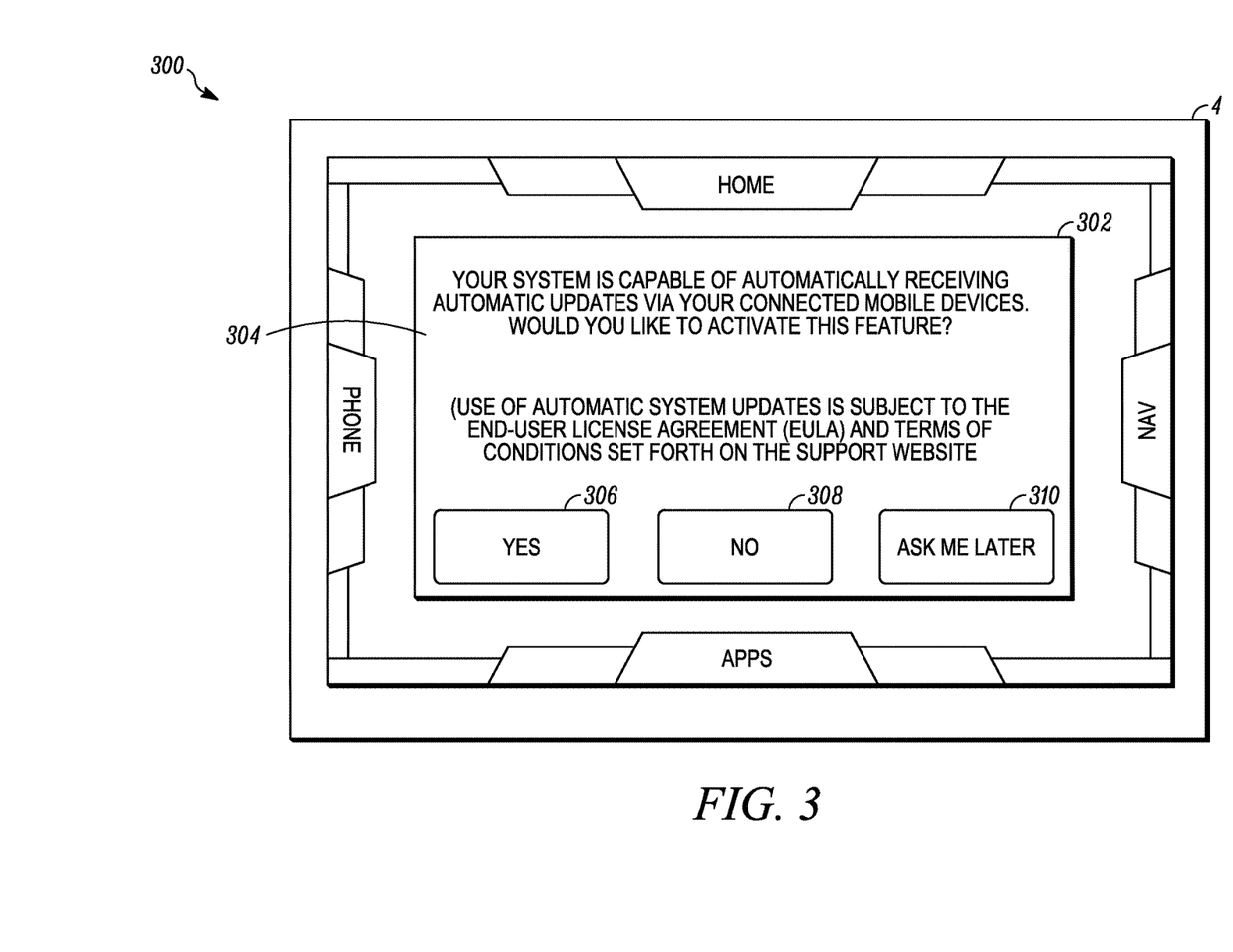
FIG. 3 illustrates an example user interface of the vehicle system for receiving consent from the user to download control updates for the vehicle by the portable device.

FIG. 3 illustrates an exemplary user interface 300 of the vehicle system 200 for receiving consent from the user to download control update(s) 206 for the vehicle 31 by the portable device 53 or directly by the vehicle 31 from the update server 210 through the network 61. The user interface 300 may be presented by the VCS 1 in the vehicle 31 via the display 4, and may include a message prompt 302 provided by the update management application 216 to request for the user to agree to use of the update retrieval application 218 to download control updates 206 for the vehicle 31. As illustrated, the message prompt 302 is included in the user interface 300 as a message above other content of the user interface 300. It should be noted that in other examples, the message prompt 302 may be provided in other forms, such as via a full-screen user interface.

The user interface 300 may further include controls configured to receive an indication from the user whether the user agrees to use of the update retrieval application 218. As an example, the user interface 300 may include a "yes" control 306 for receiving an indication from the user that the user agrees to use of the update retrieval application 218, a "no" control 308 for receiving an indication from the user that the user disagrees with use of the update retrieval application 218, and an "ask-me-later" control 310 for receiving an indication from the user that the user wishes to be provided with the message prompt 302 at a later date. If the user agrees to use of the update retrieval application 218, then the update management application 216 may utilize the update retrieval application 218 to aid in the download of control updates 206 to the vehicle 31. Otherwise, the update management application 216 may fall back to functionality not using the update retrieval application 218, such as use of the portable device 53 as a data connection (if authorized to do so by the user), use of an internal onboard modem 63 of the VCS 1, or control updates 206 may be unavailable. In some examples, the vehicle 31 will automatically download the controls and store the controls in the memory of the vehicle or in the non-current control storage in the vehicle module 202.

The user interface 300 may also be used to indicate to the user via the display that an update has been successfully downloaded and stored in the appropriate module 202. The user interface 300 can indicate to the user that the control update, which can be stored as an image, will be launched on the next restart of the vehicle after the control update has passed various checks. The user interface 300 can also provide a user with input controls to cause a module to roll back to the prior controls if the updated controls do not work properly for some modules, e.g., only the vehicle entertainment controls can be rolled-back by the user through the user interface 300.

Figure 4:
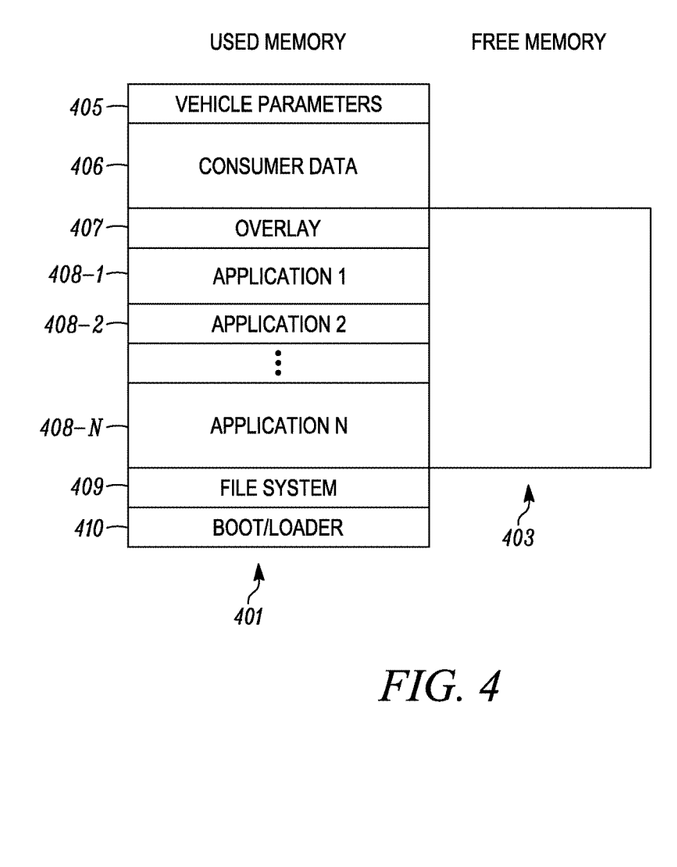
FIG. 4 illustrates a schematic representation of a storage scheme for the vehicle.

FIG. 4 illustrates a memory schematic view 400 of the storage 7 that stores a plurality of controls and system instructions in a machine readable format, e.g., a binary code. The used memory spaces 401, which include controls and programs that can be stored on the storage 7, are shown in the left column. The free space 403 is represented as the right column that does not currently contain any controls or programs that are in use in the vehicle. As shown, the left column has a greater height indicting a greater storage area then the right column. While shown as two columns, it will be appreciated that the view 400 can be a representation of a single, unitary non-volatile memory, which can be a read/write memory. That is, the illustration showing the free space and the used storage space is for clarity in describing embodiments of the present disclosure. It will be recognized that the free space need not be continuous. The file system tracking the images will store the addresses associated with the images. Hence, the file system can further operate to wear-level the non-volatile memory by locating the images in the physical memory. The storage 7 is divided into a plurality of partitions that are not defined by a certain memory size but can be defined by the sizes of the individual images, here shown as Vehicle Parameters image 405, a Consumer Data image 406, an Overlay 407, Application 1-Application N images 408-1-408-N, Image File System/Operating System image 409, and a Boot Loader image 410. The images 405-410 can be of any size. By way of an example, if the storage 7 is a solid state device, e.g., a NAND or a NOR flash device, that is defined by pages of non-volatile memory cells, then the memory size for the image will be in a multiple of the minimum number of pages required to store the respective image. Flash memory is an electronic non-volatile computer storage medium that can be electrically erased and reprogrammed. In use, a block of memory is also the smallest size that can be erased. For example, when the storage is implemented by a NAND flash system, the smallest image size is one page of flash memory.

The vehicle parameters 405 include data and configuration information in the VCS 1. Vehicle parameters 405 are written during manufacture, e.g., when the entire storage 7 is written. The vehicle parameters 405 are strongly write protected and are expected to survive any write operations and, in some embodiments, a complete re-flash of the storage 7. In some instances, some instruction modules in the core operating system 409 may rely on the vehicle parameters 405. Vehicle parameters can include vehicle specific information, e.g., CAN bus type, vehicle identification number and the like; Bluetooth (BT) and Wi-Fi MAC addresses for the vehicle; unique device identifications; device security keys (used for security scenarios); other production data related to device manufacture; key configuration values; general name/value pairs for long-term persistence (e.g., provisioning complete, theft detection values for VIN); software licenses; and installed packages.

The vehicle parameters 405 occupy at least one flash page (256 KB or larger) and have traditionally been written at a well-known good page in the flash to allow all modules to locate them without the need to perform any addressing arithmetic. However, the vehicle parameters are not limited to a specific size in some examples. To protect against flash corruption, the vehicle parameters can be mirrored multiple times in separate pages of flash memory in storage 7. Vehicle parameters 405 are stored in a flash region that is mapped outside of a read/write flash partition. Accordingly, it cannot directly be accessed by application interface calls. Applications (via APIs) are exposed to only read from this memory area from the main IFS/OS image.

The consumer data image 406 stores consumer data such as purchased content, images, personalization multimedia files, points of interest, infotainment settings, communication device settings, music, messaging, language settings, seat settings, etc. This can be thought of as a user profile that contains user data but does not include executables for security reasons. The contents of this image can be thought of as untrusted. The consumer image data 406 can have quotas to limit usage by a given application or component. In an example, the consumer data image 406 is divided into multiple separate partitions for at least some individual functions. Using the present image memory scheme, the installation of an update to the consumer data image 406 can result in a change in the memory area allocated to the consumer data. The memory scheme can thus increase or decrease the available memory for the consumer data. Moreover, the consumer data can be written over to erase the prior user's data and install general user default data in its place. As a result, all data in these areas, i.e., this "home directory," may be considered inherently untrusted and treated with the same caution as an external USB/SD mass storage partition in terms of execution. The specific contents of the consumer data image can include: "home directories" for each user profile or remote mobile application to store content or media specific to that profile. In an example, this is the only directory in flash storage that may be exposed to external input not controlled by the manufacturer or the authorized vehicle technician. Other files that cannot be accessed include settings directories for each user profile in order to store settings specific to that profile that are not for intended to be customer viewables. Various cache directories, e.g., Media Index Cache, Phonebook database, music system cache, and Navigation Internal Cache (if required) can be stored in vehicle memory. These caches generally are device or function specific and may span user profiles (e.g. media devices are not tied to a user profile rather a specific device). This allows these caches to share flash space, but will not affect application operation. Other media contact and systems as well as person machine interface content, which can be normalized, may be stored in this assigned partition for the consumer data.

The overlay data image 407 provides instructions to provide a mechanism to overlay files. Overlay files can be subsets of instructions in an image. These instructions can provide utilities to overwrite configuration files, to add/replace existing files on a production system or add new services; and/or to provide urgent production patches that need to touch a limited number of files for a given release of a control or the entire software package. However, the overlay image will not allow for general purpose patching of the system.

Applications 408-1-408-N can include instructions that operate various modules of the vehicle, including vehicle performance and infotainment features for the users. Examples of applications include a vehicle navigation system and voice activation system.

The core operating system 409 is an image file system/operating system that can be quickly loaded by the boot loader. The core operating system 409 can include the kernel and low level memory management processes to access the images stored in memory. In an example, the core operating system can include the kernel and other core applications, e.g., boot processes and a root file system. The core operating system can include a startup header, startup code, a program to initiate a boot script, a boot script, and any drivers needed to minimally configure the operating system. The core operating system partition (e.g., 409) can have at least one backup copy that can be booted in case of a failure on start-up or failed update, e.g., by the boot loader 410. The core operating system 409 can be updated using any of the update mechanisms allowed or described herein. Examples of allowable updates include a full update to replace one or more of the partitions defined by the images. An incremental update representing a patch update, if supported, can also be performed in some embodiments. An example of file systems that may be adapted to the current system include an image file system that operates as an operating system to call on the images stored as partitions in the persistent memory. e.g., the IFS system used in QNX software systems by QNX of Ottawa, Ontario, Canada.

The boot loader 410 includes protected instructions that represent the lowest level instructions to start the VCS, setup hardware, registers and locate and boot the main image off of one of the storage 7. The boot loader may be mirrored to more than one location to ensure that the software components of the vehicle launch. However, some implementations may require that the boot loader 410 start at a specific address in the vehicle storage, e.g., storage 7. The boot loader 410 is written during manufacturing. In an example, the boot loader is write-protected to protect against insertion of malicious code. Accordingly, it can only be changed with a complete storage rewriting, e.g., reflashing in the case of Flash memory as storage 7.

The size of the free space 403 is less than the size of the used memory space 401. In an example, the size of the free space 403 is less than 75% the size of the memory space 401. In an example, the size of the free space 403 is less than 50% the size of the memory space 401. The free space can be taken by a downloaded control update. For example, the systems described herein recognize the need to update the Application 1, 408-1. The control update image for Application 1 408-1 can have a size different than the current Application 1 408-1. Thus, more or less memory space in storage 7 will be used. This will change the amount of free memory 403 and the amount of used memory 401.

Figure 5:
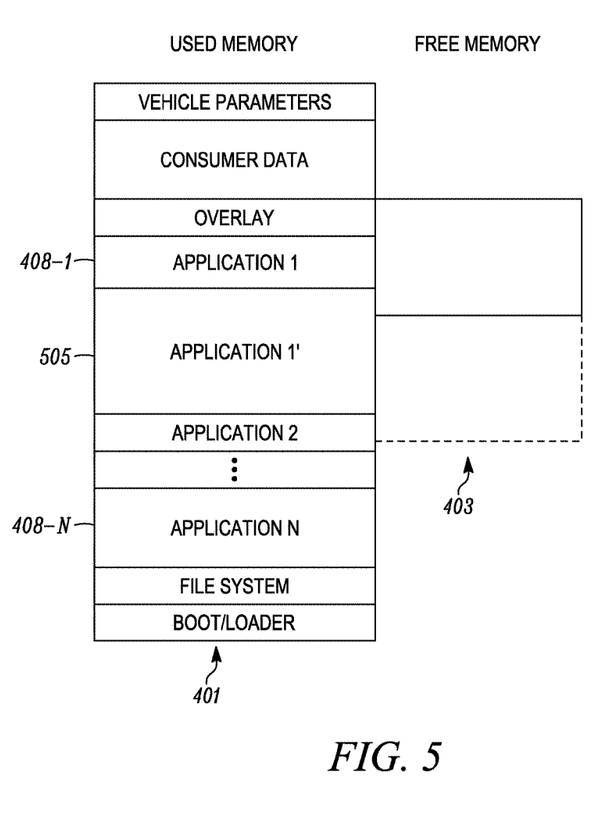
FIG. 5 illustrates a schematic representation of a storage scheme for the vehicle.

FIG. 5 illustrates a memory scheme 500 where the Application 1 408-1 is updated with Application 1' 505. Application 1' 505 is downloaded using any of the methods and systems described herein and stored in the free space 403. Thus, reducing the amount of free space from the free space shown in FIG. 4 (also indicated in broken line in FIG. 5) to the free space shown in FIG. 5 (in solid line). The Application 1' 505 is larger in size than the currently running Application 1 408-1. The control update of Application 1' is checked for errors on an image basis. Examples of error checking include a hash function, cyclic redundancy checks (CRC), error-correcting codes or a checksum algorithm to detect errors in an image. In an example, the hash function adds a fixed-length tag to the image as it is being stored in the free space of the storage 7. The VCS 1 can verify the delivered image file by re-computing the tag and comparing it with the one provided. Another error checking function can include random-error-correcting codes based on minimum distance coding to provide a suitable alternative to hash functions when a strict guarantee on the minimum number of errors to be detected is desired. Another error checking strategy can include repetition codes. Although somewhat inefficient, they may be used for both error correction and detection in the present case as the error detection and correction are performed on an image basis and not on a file-by-file basis. When the Application 1' 505 passes the error checking, it can replace the current Application 1 408-1.

Figure 6:
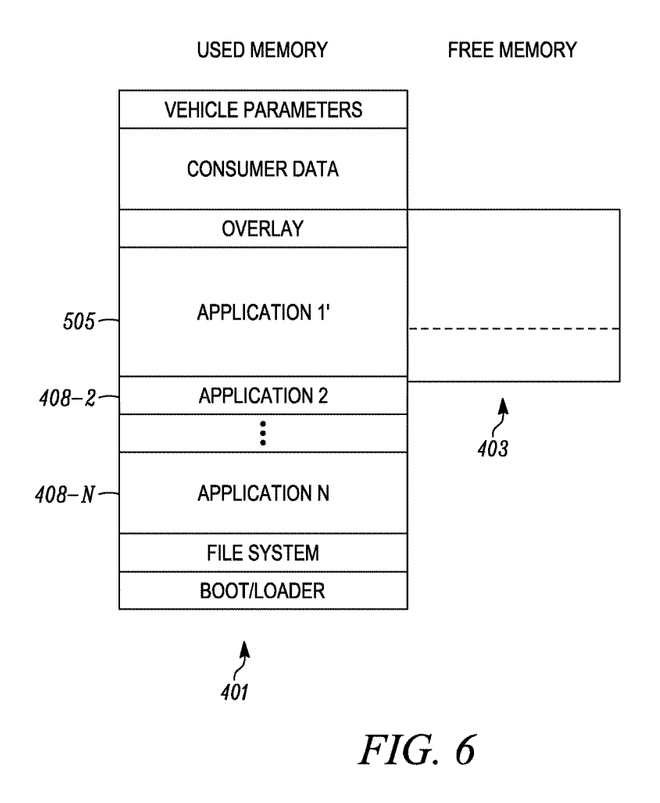
FIG. 6 illustrates a schematic representation of a storage scheme for the vehicle.

FIG. 6 illustrates a memory scheme 600 after the new Application 1' 505 has been configured in place of the old Application 408-1. When the vehicle starts again, it will use the new Application 1' 505 in place of the old Application 408-1. Once the new Application 1' 505 is operating satisfactorily, the old Application 1 408-1 is deleted and the new memory scheme 600 is implemented. The old Application 408-1 is deleted and the memory space at 408-1 is freed.

It will be understood that FIGS. 4-6 schematically show the memory system with ordered locations of the vehicle parameters 405, the consumer data 406, overlay image 407, images, e.g., 408-1 through 408-N, file system 409 and boot loader 410. It is within the scope of the present disclosure for any of these partitions defined by the images or other files to be located non-sequentially in the storage 7. The file system 409 can track the locations and point to the images as needed to access the images when the computing systems boot. For example, the images can be located and accessed using a logical block addressing strategy.

The memory shown in FIGS. 4-6 can operate using a storage method for providing a memory system in a vehicle. A single large read/write partition is established in the memory. The method uses a hybrid approach to deliver deterministic guarantees of a block-based approach with the flash-utilization benefits of a file-based approach. A single large read/write partition is established in the vehicle memory for the applications. In an embodiment, this single large partition is sized to be less than twice the size of the images to be mounted thereon. Such a requirement can be from a perspective of the cost of duplicating the entire used space as free space in the storage. Read-only file system images are mounted on the large partition, which are tracked by a file system but the images contain files and data to perform an individual application. Some of these images are protected from being overwritten and replaced except when the entire partition is re-flashed by an authorized vehicle repair person. Examples of these protected images can include vehicle parameters, and the file system instructions.

Multiple non-protected images are mounted in the single partition. These image files are not as protected as the boot loader and the file system instructions and can include a plurality of applications, overlay, consumer data, and the like. Each of the images is mounted to a mount point or as an overlay in a root directory. The images can then be individually addressed and executed when needed by the vehicle. The images are accessed by a file system that loads the images as needed for various modules in the vehicle.

Each of the images can be a separate part number. A part number uniquely identifies a component in the system. In an example, each of the applications 408-1 through 408-N (FIGS. 4-6) have a unique part number. Such a part number can also identify the version of the application, which can be used to control the installation of subsequent images. The part number can be used as a control device to identify which application to use in the vehicle. Hence, the images are individual components in the vehicle memory that can be accessed as individual partitions. This allows the number of software images (software components) to grow or shrink as needed when the number of software controls grows or shrinks after the vehicle leaves the manufacturer. The vehicle memory can further operate to wear level the memory to reduce the possibility of errors. Tracking the images by part numbers is a simple way to track what software is mounted in the vehicle.

The presently described method(s) and system(s) can also use a background update by downloading a new part-number-identified image to free space in the partition. The integrity of an entire image can be checked. For example, cyclic redundancy check (CRC) or other hash check can be used to check the integrity of the downloaded image. The signature of the image can be checked with one or more tools, such as x509 or public key infrastructure (PKI) and Privilege Management Infrastructure (PMI), for example. Once checked or verified, the new image can be used by the vehicle on the next reboot of the vehicle's electronic system. Once the new image is determined to work correctly, the old image can be deleted. Memory space is then freed for future use.

Variations on the control update processes are possible. For example, in some cases the update retrieval application 218 may be configured to query the update server 210 for the software updates 206 to be installed. As another example, in some cases the update retrieval application 218 may be configured to prioritize certain software updates 206 over other updates. For example, if a software update 206 to be installed is indicated as being a high priority update, then the update retrieval application 218 may be configured to retrieve that high priority software update 206 over any available connection, without waiting for a preferred connection or connection type.

The examples described herein allow the vehicle to continue to operate while a control update is sent to the vehicle and loaded to a vehicle module. The use of a plurality of memory locations in a vehicle module allows the module to store both non-active and active controls. The storage of control updates in a location that is not currently active in the module allows the vehicle time to perform checks as to validity of the controls and operability of the controls, both within the vehicle module and in use with other vehicle modules and components.

An image can be mounted in the computing system and act as a separate, standalone file system including control instructions and data needed to perform the tasks of a module of the vehicle. The vehicle has an operating system, one or more file systems, as well as a bootloader and other data components resident in nonvolatile (e.g., flash) memory. The file system tracks images stored in the memory and allows the various functions of the vehicle to operate using partitioned memory. The images act as individual partitions that are fixed in size once mounted in the storage. However, when an update to the control is needed, then the image and its associated partition are not fixed in size but can vary based on the size of the image. This allows the size of the memory to be less than twice the size of all of the images and still allow updates to an image. The use of image further reduces the overhead of performing error detection and correction. Unlike file-by-file checks, checking on an image basis uses fewer resources.

The present disclosure addresses the drawbacks of two traditional memory systems, namely, file based memory and block based memory. A file system that is updated results in a deterministic outcome at the file level but is non-deterministic at a page level. Accordingly, a file system is difficult to error check, test and authenticate that all files are present, unmodified and correct. Moreover, these problems scale with the number of files. Traditional block-based updates require fixed-size updates and fixed-offsets within the flash memory. Such a system is difficult to use in a vehicle as it is difficult to adjust partitioning in the field. Thus, the nonvolatile, e.g., flash, memory must be at least twice the size of the entire software to allow for updates and offsets, along with space for increased size in the controls that may be downloaded in the future.

The present disclosure provides a program storage system that is deterministic at the image level. That is, when a set version of an image is stored in the vehicle memory there are known bit values at a location within that image. This improves error checking of the image. This is not the case for a file stored in the vehicle memory. This is the case even if the core operating system stores an image in non-sequential locations in physical memory. The core operating system need only logically track the physical locations of the bit being checked and translate that to the image location being error checked.

While the above description describes using an over-the-air update to communicate control updates, in machine operable language, to the vehicle, the present systems and methods can also be used with a hard-wired connection, e.g., a memory card or memory device connected to the vehicle, e.g., through a wired connection such as a USB connection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a plurality of vehicle systems that operate using a plurality of updatable control applications, wherein each control application is mounted as an image and not as a file;
    a non-volatile vehicle memory to store the plurality of updatable control applications having an application memory size less than twice a size of all of the control applications; and
    a file control system to provide access to the images in the memory, wherein the memory is updatable on an image basis and not on a file basis within the image,
    wherein the control applications include a first group of fixed images that cannot be updated over-the-air and a second group of images that can be updated over-the-air, wherein the non-volatile vehicle memory stores vehicle parameters and consumer data which cannot be updated over-the-air and with the vehicle parameters mirrored across multiple pages of the non-volatile vehicle memory, wherein the first group includes a vehicle parameter image, and wherein the second group includes a plurality of application images.

2. The vehicle of claim 1, wherein the image of each control application is a fixed size of at least one page of the non-volatile vehicle memory and a multiple of pages of the non-volatile vehicle memory.

3. The vehicle of claim 1, wherein the memory is a single partition divided into sub-partitions in which the images are stored and the sub-partitions do not have fixed offsets.

4. The vehicle of claim 1, wherein the file control system tracks images stored on the memory.

5. The vehicle of claim 1, wherein the file control system is configured to error check on an image basis and not on a file basis.

6. The vehicle of claim 5, wherein the file control system is configured to check the file for modification and for a valid digital signature.

7. The vehicle of claim 1, wherein the vehicle memory stores a boot loader and the images are stored at fixed offsets with the boot loader selecting the application image to load.

8. A method for storing controls in a vehicle having a persistent storage with a plurality of images mounted in the storage, comprising:
    accessing the images to perform a vehicle device function;
    loading an updated image to free memory in the storage to replace a current image executing vehicle functions in hardware, wherein the free memory is less than used memory of the storage with total memory of both the free memory and the used memory being less than twice the size of updatable control applications;
    checking the updated image;
    in response to the updated image being checked as valid, loading the updated image on next boot of the vehicle;
    in response to the updated image passing the updated image check and working in-vehicle after boot, erasing the non-booted current image from storage; and
    mounting images that each contain a vehicle control onto the storage, wherein each image is mounted as a separate partition in the storage,
    wherein accessing the images includes using logical block addressing to track the images loaded as partitions on the storage.

9. The method of claim 8, wherein accessing the images includes tracking the images using a file system for the persistent storage.

10. The method of claim 8, wherein checking the updated image includes performing a checksum error detection and checking a part number of the updated image.

11. The method of claim 8, wherein loading an updated image includes receiving the updated image over-the-air.

12. The method of claim 8, wherein erasing the non-booted current image includes freeing memory space containing the non-booted current image to a file system that tracks the images on the storage.

13. A vehicle comprising:
    persistent flash storage having a plurality of images mounted therein and sized to be less than twice a size of vehicle control application files in the persistent flash storage, wherein each image is mounted as a separate partition in the persistent flash storage; and
    one or more processors programmed to access the images to perform a vehicle function, load an updated image to free memory in the persistent flash storage to replace a current image with each updated image having a minimum size of one page of flash storage and a size equal to a multiple of pages of flash storage, check the updated image, in response to the updated image being checked as valid, load the updated image on next boot of the vehicle, and in response to the updated image passing the updated image check and working in-vehicle after boot, erase the non-booted current image from storage, wherein the persistent flash storage is updatable on an image basis and not on a file basis within the image;
    wherein accessing the images includes using logical block addressing to track the images loaded as partitions on the persistent flash storage.

14. The vehicle of claim 13, wherein the free memory is less than used memory of the storage.

* * * * *